(12) United States Patent
Shirakawa et al.

(10) Patent No.: US 9,657,713 B2
(45) Date of Patent: May 23, 2017

(54) ROTARY SHAFT DEVICE AND VERTICAL SHAFT FLUID POWER GENERATOR

(71) Applicant: THK CO., LTD., Tokyo (JP)

(72) Inventors: Yuji Shirakawa, Tokyo (JP); Yuki Hayashi, Tokyo (JP)

(73) Assignee: THK CO., LTD., Tokyo (JP)

( * ) Notice: Subject to any disclaimer, the term of this patent is extended or adjusted under 35 U.S.C. 154(b) by 275 days.

(21) Appl. No.: 14/396,644

(22) PCT Filed: Apr. 10, 2013

(86) PCT No.: PCT/JP2013/060823
§ 371 (c)(1),
(2) Date: Oct. 23, 2014

(87) PCT Pub. No.: WO2013/161566
PCT Pub. Date: Oct. 31, 2013

(65) Prior Publication Data
US 2015/0098797 A1 Apr. 9, 2015

(30) Foreign Application Priority Data
Apr. 26, 2012 (JP) ................. 2012-101268

(51) Int. Cl.
*F03D 3/06* (2006.01)
*F03D 80/70* (2016.01)
(Continued)

(52) U.S. Cl.
CPC ............ *F03D 3/06* (2013.01); *F03D 3/062* (2013.01); *F03D 80/70* (2016.05); *F16C 19/163* (2013.01);
(Continued)

(58) Field of Classification Search
CPC . F03D 3/06; F03D 3/005; F03D 80/00; F03D 80/70; F16C 33/58; F16C 33/581;
(Continued)

(56) References Cited

U.S. PATENT DOCUMENTS 4,993,851 A * 2/1991 Nakanishi ............... F16C 19/16
384/512
2002/0193195 A1  12/2002 Ishiguro et al.
(Continued)

FOREIGN PATENT DOCUMENTS

CN  101680488 A   3/2010
JP  02-284017 A   11/1990
(Continued)

OTHER PUBLICATIONS

Extended European Search Report dated Dec. 23, 2015, issued in counterpart European Patent Application No. 13781795.3. (6 pages).
(Continued)

*Primary Examiner* — Craig Kim
*Assistant Examiner* — Brian P Wolcott
(74) *Attorney, Agent, or Firm* — Westerman, Hattori, Daniels & Adrian, LLP

(57) ABSTRACT

A rotary shaft device (3) includes a shaft body (20) rotatably supported by angular bearings (35, 36), and a support body (40) configured to rotatably support the shaft body (20) via the angular bearings (35, 36). A ball rolling groove (21) having a Gothic arch shape in which rolling elements (39) of the angular bearings (35, 36) roll is formed in an outer circumferential surface of the shaft body (20).

4 Claims, 4 Drawing Sheets

(51) Int. Cl.
*F16C 33/58* (2006.01)
*F16C 19/18* (2006.01)
*F16C 19/16* (2006.01)
*H02K 7/18* (2006.01)
*F03D 3/00* (2006.01)
*F16C 3/02* (2006.01)

(52) U.S. Cl.
CPC .......... *F16C 19/181* (2013.01); *F16C 33/581* (2013.01); *F16C 33/585* (2013.01); *F03D 3/005* (2013.01); *F16C 3/02* (2013.01); *H02K 7/183* (2013.01); *Y02E 10/74* (2013.01)

(58) Field of Classification Search
CPC ...... F16C 33/585; F16C 19/181; F16C 19/16; F16C 19/163; F16C 19/166; F16C 3/02; F16C 2240/76; H02K 7/183; Y02E 10/74
See application file for complete search history.

(56) References Cited

U.S. PATENT DOCUMENTS

2010/0123317 A1* 5/2010 Leijon ..................... F03D 3/005
290/55
2013/0336608 A1* 12/2013 Miller ................. F16C 33/6677
384/475

FOREIGN PATENT DOCUMENTS

| JP | 02284017 A | * | 11/1990 |
|----|------------|---|---------|
| JP | 07-041057 U | | 7/1995 |
| JP | 08-226439 A | | 9/1996 |
| JP | 11-013750 A | | 1/1999 |
| JP | 11-098752 A | | 4/1999 |
| JP | 2000-120668 A | | 4/2000 |
| JP | 2005-042892 A | | 2/2005 |
| JP | 2005-061431 A | | 3/2005 |
| JP | 2006-207374 A | | 8/2006 |
| JP | 2006-316723 A | | 11/2006 |
| JP | 2012-17736 A | | 1/2012 |
| TW | M310950 | | 5/2007 |
| TW | 201104071 A | | 2/2011 |
| WO | 2005/111415 A1 | | 11/2005 |

OTHER PUBLICATIONS

Office Action dated Dec. 29, 2015, issued in counterpart Chinese Patent Application No. 201380021065.8, with Partial English translation. (8 pages).
International Search Report dated Jun. 18, 2013, issued in corresponding application No. PCT/JP2013/060823.
JP Office Action dated Jul. 8, 2014, issued in corresponding application No. JP2012-101268.
JP Office Action dated Aug. 26, 2014, issued in corresponding application No. JP2012-101268.
Office Action dated Aug. 26, 2016, issued in counterpart Taiwanese Application No. 102114244, with English translation. (4 pages).

* cited by examiner

ROTARY SHAFT DEVICE AND VERTICAL SHAFT FLUID POWER GENERATOR

TECHNICAL FIELD

The present invention relates to a rotary shaft device and a vertical shaft fluid power generator.

Priority is claimed on Japanese Patent Application No. 2012-101268, filed Apr. 26, 2012, the content of which is incorporated herein by reference.

BACKGROUND ART

As a vertical shaft fluid power generator configured to perform power generation using a flow of a fluid, for example, a wind turbine generator using a flow of wind (a working fluid) has been developed. The vertical shaft wind turbine generator includes a shaft body, a plurality of blades (wind turbines), a support body, a generator, and so on.

The plurality of blades is arranged about a central axis of the shaft body at intervals. The support body rotatably supports the shaft body about the central axis via a bearing. The generator generates electric power from rotation of the shaft body.

In a wind turbine generator disclosed in Patent Literature 1, a rotary mechanism (a shaft body) integrated with a vertical vane (a blade) extends in a direction perpendicular to the ground (a direction perpendicular to a horizontal plane). The rotary mechanism (the shaft body) is rotatably supported with respect to an intermediate fixing shaft (a support body) via a pair of bearings (bearings).

CITATION LIST

Patent Literature

[Patent Literature 1] Japanese Unexamined Patent Application, First Publication No. 2006-207374

SUMMARY OF INVENTION

Technical Problem

A vertical wind turbine generator of the related art has the following problems. An external force in a radial direction (a direction crossing a central axis direction of the shaft body) or a thrust direction (a direction along the central axis direction) is applied to the bearings by movement of the working fluid or a weight of the blade and the shaft body. However, when the bearings cannot sufficiently support these loads, vibrations occur in the apparatus, and thus the shaft body cannot be smoothly rotated.

In addition, it is difficult to accurately set concentricity of the bearings. For this reason, when accuracy of the concentricity cannot be sufficiently secured, a rotation center of the shaft body is likely to be oscillated from the central axis of the shaft body, and the shaft body cannot be smoothly rotated.

Here, employing the bearing in which a ball rolling groove is directly formed in an outer circumferential surface of the shaft body is considered. In this case, it is necessary to efficiently and securely measure machining accuracy of the rolling groove formed in the outer circumferential surface of the shaft body.

The present invention is directed to provide a rotary shaft device and a vertical shaft fluid power generator that are capable of efficiently and securely measuring the machining accuracy of the ball rolling groove formed in the outer circumferential surface of the shaft body.

Solution to Problem

According to a first aspect of the present invention, there is provided a rotary shaft device including a shaft body rotatably supported by an angular bearing; and a support body configured to rotatably support the shaft body via the angular bearing, wherein the shaft body has a ball rolling groove formed in an outer circumferential surface thereof, having a Gothic arch shape, and in which a rolling element of the angular bearing rolls.

According to a second aspect of the present invention, in the rotary shaft device of the first aspect, the ball rolling groove of an outer wheel opposite to the ball rolling groove with the rolling element interposed therebetween has a circular arc shape.

According to a third aspect of the present invention, in the rotary shaft device of the first or second aspect, a clearance groove having a radius of curvature smaller than that of the ball rolling groove is formed at a peak portion of the Gothic arch shape of the ball rolling groove.

According to another aspect of the present invention, there is provided a vertical shaft fluid power generator including a shaft body; a plurality of blades arranged about a central axis of the shaft body at intervals and connected to the shaft body; a support body configured to rotatably support the shaft body via a bearing; and a generator configured to generate electric power by rotation of the shaft body, wherein the rotary shaft device according to any one of first to third aspects is used as the shaft body and the support body.

Advantageous Effects of Invention

The present invention can efficiently and securely measure the machining accuracy of the ball rolling groove formed in the outer circumferential surface of the shaft body.

DESCRIPTION OF EMBODIMENTS

An embodiment of the present invention will be described with reference to the accompanying drawings.

Figure 1:
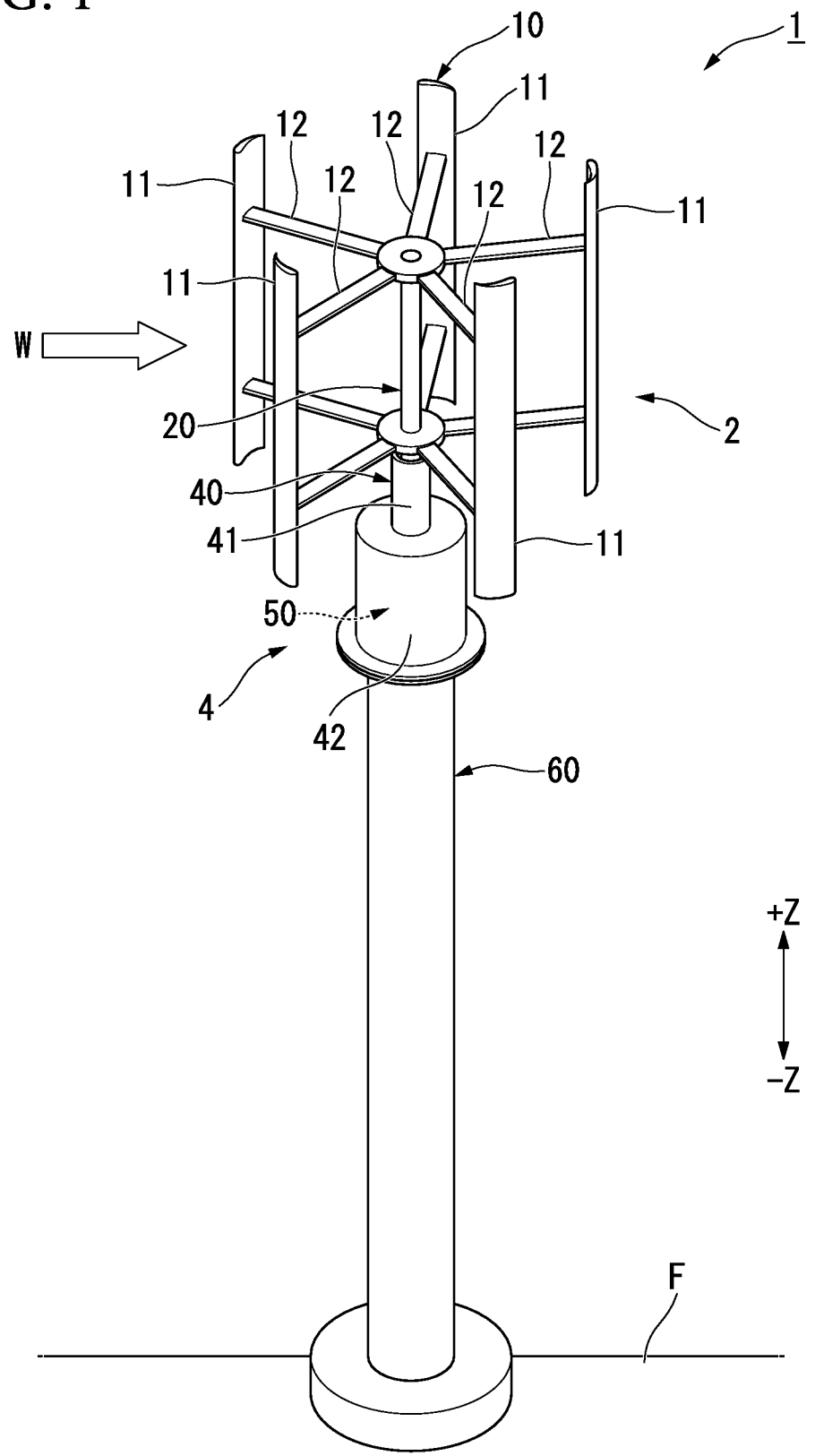
FIG. 1 is a perspective view showing a vertical shaft wind turbine generator 1 according to an embodiment of the present invention.

FIG. 1 is a perspective view showing a vertical shaft wind turbine generator 1 according to an embodiment of the present invention.

Figure 2:
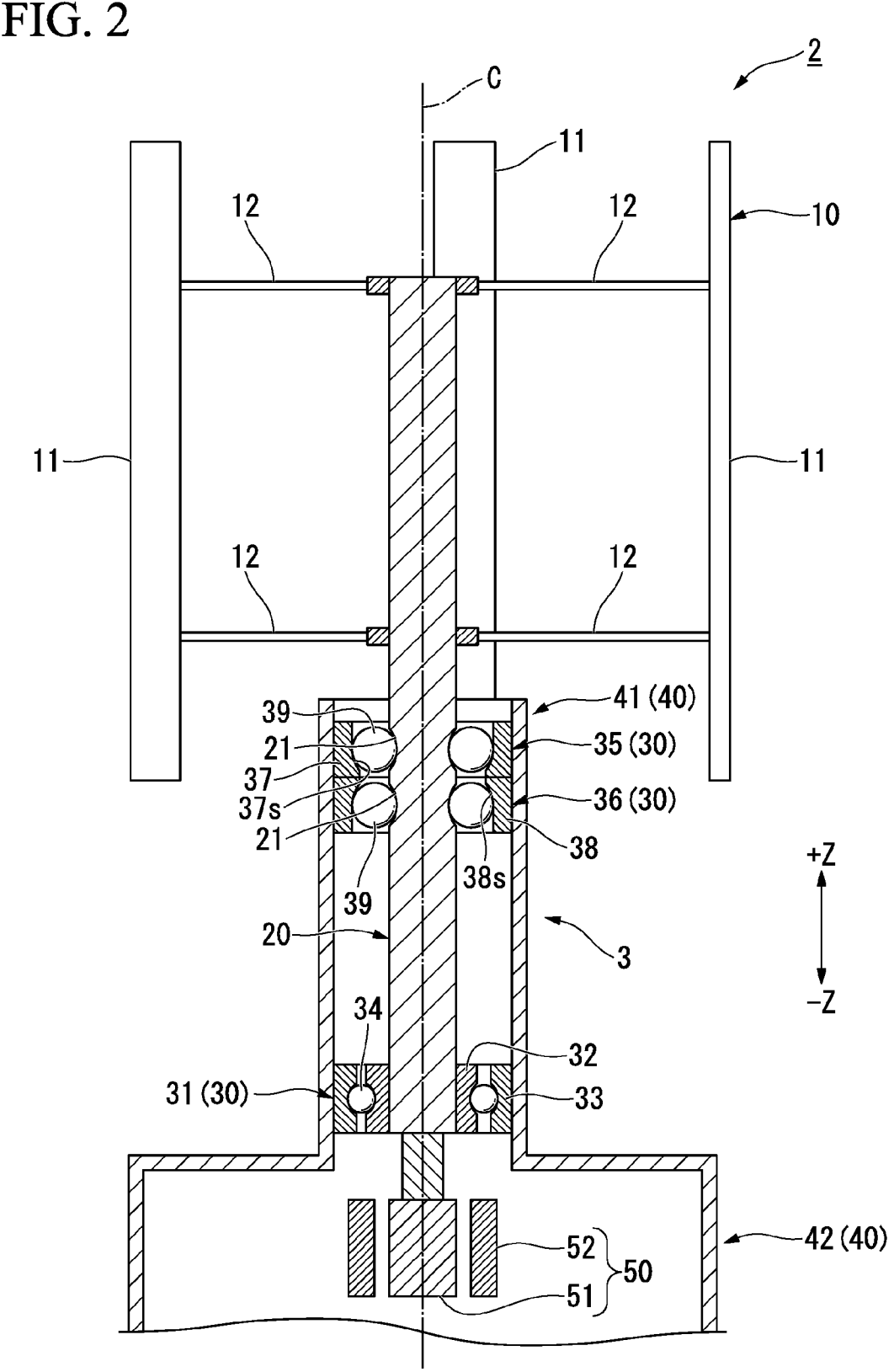
FIG. 2 is a side cross-sectional view showing the vertical shaft wind turbine generator 1.

FIG. 2 is a side cross-sectional view showing the vertical shaft wind turbine generator 1.

As shown in FIGS. 1 and 2, the vertical shaft wind turbine generator (a vertical shaft fluid power generator) 1 includes a rotary mechanism 2, a power generating mechanism 4, and so on. The rotary mechanism 2 receives wind W and rotates. The power generating mechanism 4 converts mechanical energy obtained by the rotary mechanism 2 into electric energy.

A vertical direction is referred to as a Z direction. The Z direction may be referred to as a central axis C direction or an axial direction. In the Z direction, an upward side (a wind turbine 10 side) is referred to as a +Z direction, and a downward side (a tower 60 side) is referred to as a −Z direction.

The rotary mechanism 2 includes the wind turbine 10, a rotary shaft 20, a casing 40, and so on. The wind turbine 10 receives the wind W. The rotary shaft 20 is connected to the wind turbine 10. The casing 40 rotatably supports the rotary shaft 20 about a central axis C via a bearing 30.

In the rotary mechanism 2, a device constituted by the rotary shaft 20, the bearing 30 and the casing 40 is referred to as a rotary shaft device 3.

The power generating mechanism 4 includes a generator 50.

The generator 50 converts the mechanical energy obtained by a rotation of the rotary shaft 20 in a circumferential direction (about the central axis C) into electric energy to generate electric power. The rotary mechanism 2 and the power generating mechanism 4 are disposed on the tower (a post) 60 vertically installed on the ground F and extending in the vertical direction.

The wind turbine 10 is, for example, a gyromill type wind turbine (a rotor). The wind turbine 10 includes a plurality of blades 11 having rectangular plate shapes or strip shapes.

The plurality of blades 11 are disposed to extend in a direction perpendicular to the ground F. The plurality of blades 11 are arranged about the central axis C of the rotary shaft 20 in the circumferential direction at intervals. The plurality of blades 11 are connected to the rotary shaft 20 via a plurality of arms 12.

The blades 11 are formed in a shape to generate a lifting force when the wind W is received. The wind turbine 10 is rotated by the lifting force about the central axis C of the rotary shaft 20.

The wind turbine 10 has no dependence with respect to a wind direction. The wind turbine 10 is set to a shape rotatable about the central axis C of the rotary shaft 20 with respect to the wind W from any direction.

As shown in FIG. 2, the rotary shaft 20 is disposed to extend in the vertical direction such that the central axis C is perpendicular to the ground F. The rotary shaft 20 is rotatably supported with respect to the casing 40 via the bearing 30.

A first end of the arm 12 is connected to an outer circumferential surface of the rotary shaft (a shaft body) 20. The arm 12 is formed in a rectangular plate shape or a strip shape. The plurality of arms 12 protrude from the outer circumferential surface of the rotary shaft 20 outward in the radial direction. The arms 12 are arranged in the circumferential direction of the rotary shaft 20 at equal intervals.

The blades 11 are connected to a second end of the arm 12. The pair of arms 12 is installed in parallel with respect to one of the blades 11 while spaced apart from each other in the central axis C direction.

The bearings 30 are installed in the vicinity of a central section and in the vicinity of a lower end section of the rotary shaft 20. The rotary shaft 20 is rotatably supported with respect to the casing 40 via the bearing 30.

The bearing 30 includes a radial bearing 31, and double row angular bearings 35 and 36, which are spaced apart from each other in the central axis C direction of the rotary shaft 20.

The radial bearing 31 is disposed at an end section of the generator 50 side in the central axis C direction (the −Z direction). An inner wheel 32 of the radial bearing 31 is fixed to a lower end side of the rotary shaft 20.

The double row angular bearings 35 and 36 are disposed at the wind turbine 10 side in the central axis C direction (the +Z direction). Ball rolling grooves 21 of the double row angular bearings 35 and 36 are formed at a central section of the rotary shaft 20 side by side.

The angular bearings 35 and 36 have only outer wheels 37 and 38. Inner wheels (the ball rolling grooves 21) of the angular bearings 35 and 36 are integrally formed with the rotary shaft 20. The two ball rolling grooves 21 in which a plurality of balls (rolling elements) 39 roll are formed in the outer circumferential surface of the rotary shaft 20 at which the double row angular bearings 35 and 36 are installed.

The two ball rolling grooves 21 are formed in an annular shape extending in the circumferential direction in the outer circumferential surface of the rotary shaft 20 and in a curved shape recessed toward the central axis C.

The casing (a support body) 40 is constituted by an upper portion 41 and a lower portion 42. The upper portion 41 is a portion close to the wind turbine 10 (the +Z direction). The lower portion 42 is a portion close to the tower 60 side (the −Z direction) and opposite to the wind turbine 10. The casing 40 is formed in a multi-step cylindrical shape having a smaller diameter at the upper portion 41 than the lower portion 42.

A lower end section of the lower portion 42 of the casing 40 is connected to an upper end section of the tower 60.

The outer wheels 37 and 38 of the angular bearings 35 and 36 are fixed to the inner circumferential surface of the upper portion 41 of the casing 40 at an upper end side (the +Z direction). An outer wheel 33 of the radial bearing 31 is fixed to the inner circumferential surface of the upper portion 41 of the casing 40 at a lower end side (the −Z direction).

The angular bearings 35 and 36 have a plurality of balls 39 having the same diameter. The balls 39 may have a diameter different from that of a ball 34 of the radial bearing 31. The balls are not limited thereto but may have the same diameter.

The generator 50, a control unit (not shown), and so on, are accommodated in the lower portion 42 of the casing 40.

The generator 50 converts a rotational force (mechanical energy) obtained by rotation of the rotary shaft 20 into electric energy to generate electric power. The generator 50 includes a magnet rotor 51 and a coil stator 52. The magnet rotor 51 is rotated with the rotary shaft 20 connected to a lower end of the rotary shaft 20. The coil stator 52 is disposed to surround an outer circumferential side of the magnet rotor 51.

In the vertical shaft wind turbine generator 1, when the wind turbine 10 receives the wind W to rotate the rotary shaft 20 about the central axis C, the magnet rotor 51 connected to the rotary shaft 20 is also rotated about the central axis C. The magnet rotor 51 is rotated concentrically (on the central axis C) with the wind turbine 10 and the rotary shaft 20.

As the magnet rotor 51 is rotated about the central axis C with respect to the coil stator 52, electromagnetic induction is generated between the magnet rotor 51 and the coil stator 52 to generate electric power.

Figure 3:
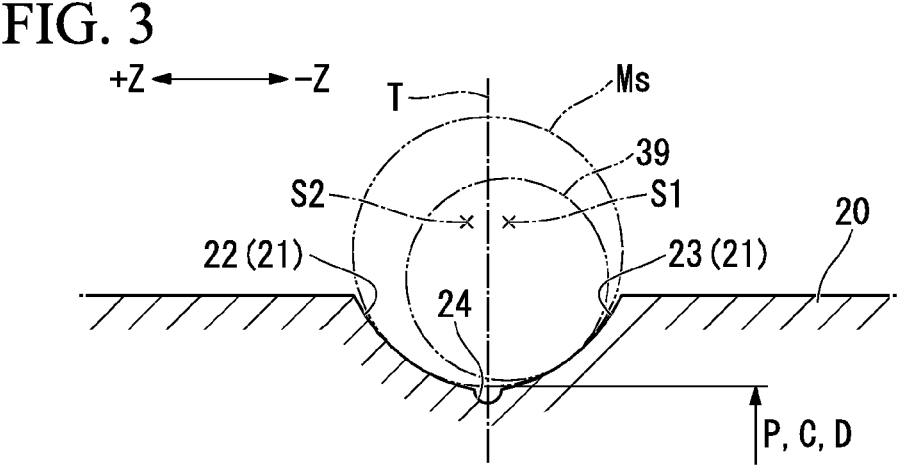
FIG. 3 is an enlarged cross-sectional view showing a ball rolling groove 21 formed in an outer circumferential surface of a rotary shaft 20.

FIG. 3 is an enlarged cross-sectional view showing the ball rolling groove 21 formed in the outer circumferential surface of the rotary shaft 20.

Figure 4:
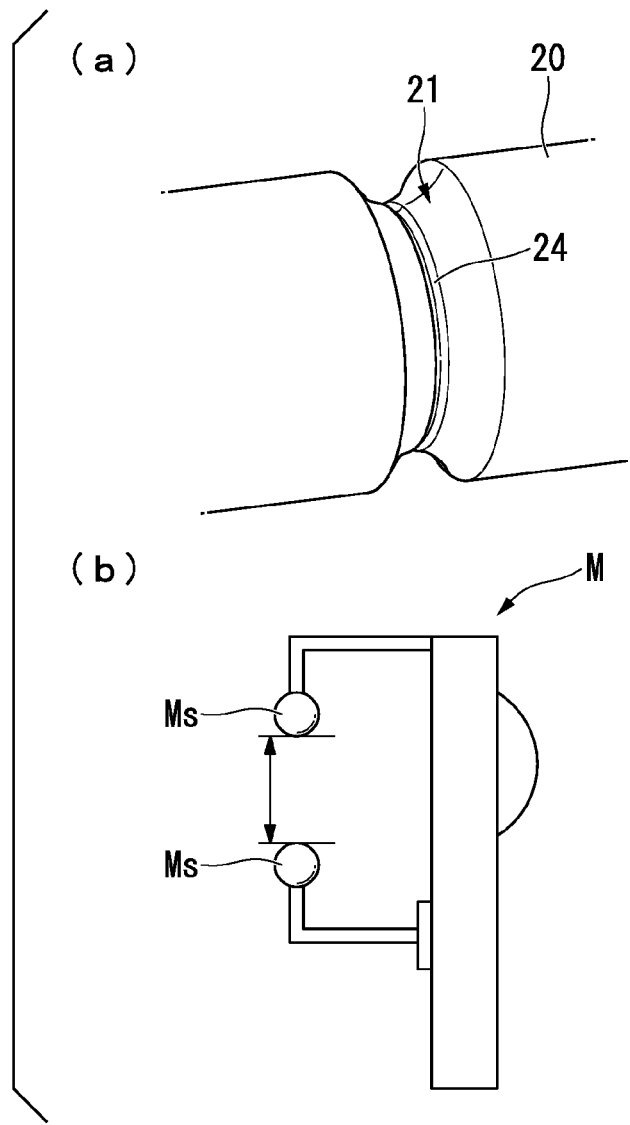
FIG. 4 is a view for describing a method of inspecting the ball rolling groove 21.

FIG. 4 is a view for describing a method of inspecting the ball rolling groove 21, (a) showing a perspective view of the ball rolling groove 21, and (b) showing a schematic view of a micrometer M.

Figure 5:
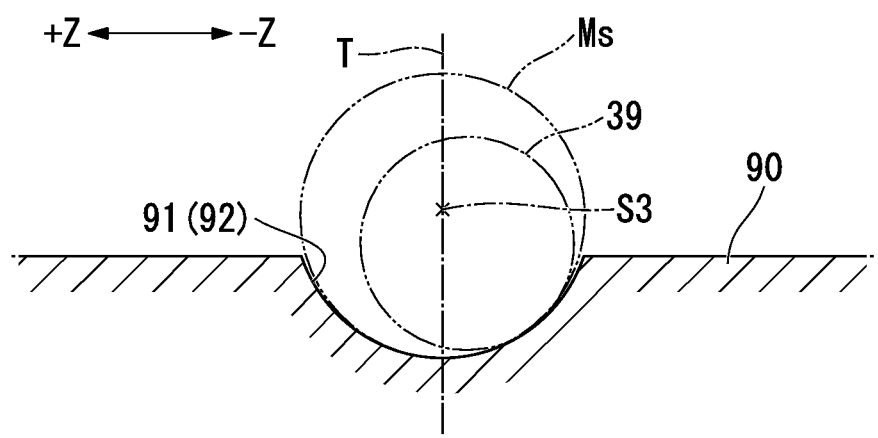
FIG. 5 is an enlarged cross-sectional view showing a ball rolling groove 91 of the related art.

FIG. 5 is an enlarged cross-sectional view showing a ball rolling groove of the related art.

As shown in FIG. 3, the ball rolling groove 21 formed in the outer circumferential surface of the rotary shaft 20 is formed in a so-called Gothic arch shape. The ball rolling groove 21 has a first groove surface 22 formed at an upward side in the axial direction (the +Z direction) and a second groove surface 23 formed at a downward side in the axial direction (the −Z direction), with respect to a groove center T.

The first groove surface 22 and the second groove surface 23 have symmetrical arc shapes with reference to the groove center T. A center S1 of the first groove surface 22 is disposed at a downward side in the axial direction (the −Z direction) lower than the groove center T, and a center S2 of the second groove surface 23 is disposed at an upward side in the axial direction (the +Z direction) higher than the groove center T. Accordingly, the ball rolling groove 21 is formed in the Gothic arch shape (a pointed arch shape) in which a portion of the groove center T is sharply deepened.

The ball 39 of the angular bearing 35 rolls in the second groove surface 23, and the ball 39 of the angular bearing 36 rolls in the first groove surface 22. Accordingly, the ball rolling groove 21 and the ball 39 are in one-point contact with each other and can reduce differential sliding.

A clearance groove 24 having a radius of a cross-section (a radius of curvature) smaller than that of the first groove surface 22 and the second groove surface 23 is formed at the groove center T (a peak portion of the Gothic arch shape) of the ball rolling groove 21. For example, this is because, when the first groove surface 22 is machined through super finishing, an end section of a tool (not shown) does not come in contact with the second groove surface 23.

When the ball rolling groove 21 is formed in the outer circumferential surface of the rotary shaft 20, there is a need to manage machining accuracy of the ball rolling groove 21. This is because the ball 39 smoothly rolls while receiving an appropriate load between the ball rolling groove 21 and the outer wheels 37 and 38. Specifically, there is a need to strictly manage a pitch circle diameter (P.C.D.) of the ball rolling groove 21.

As shown in a part (b) of FIG. 4, the micrometer M is used to measure the P.C.D. of the ball rolling groove 21. The micrometer M has a pair of probes Ms. Spherical bodies are used in the pair of probes Ms. A radius dimension of the probe Ms is arbitrarily selected from the radius dimensions, which are already known. For example, the radius dimension of the probe Ms is set to be larger than that of the ball 39.

In general, an essential condition is that the probe Ms of the micrometer M not deviate in the axial direction when a diameter of the columnar member is measured. When centers of the pair of probes Ms are not disposed on a cross-section perpendicular to the central axis of the columnar member, the diameter of the columnar member cannot be accurately measured.

Similarly, in measurement of the P.C.D. of the ball rolling groove 21, an essential condition is that the probe Ms of the micrometer M not deviate in the axial direction.

In the vertical shaft wind turbine generator 1, as shown in FIG. 3, when the probe Ms of the micrometer M is pushed against the ball rolling groove 21, the probe Ms abuts the first groove surface 22 and the second groove surface 23. The probe Ms comes in two-point contact with the ball rolling groove 21. For this reason, the probe Ms does not generate positional deviation in the axial direction (in FIG. 3, the Z direction). Accordingly, the P.C.D. of the ball rolling groove 21 can be securely measured using the micrometer M (the probe Ms).

On the other hand, as shown in FIG. 5, in a rotary shaft 90 of the related art, a ball rolling groove 91 is formed in a circular arc shape. The ball rolling groove 91 is formed of a single groove surface 92. A center S3 of the groove surface 92 is disposed in the groove center T.

However, it is impossible to securely measure the P.C.D. with respect to the ball rolling groove 91 of the rotary shaft 90, which is a columnar member, using the micrometer M (the probe Ms).

In a case that the pair of probes Ms of the micrometer M have a radius smaller than that of the groove surface 92, when the probe Ms of the micrometer M is pushed against the ball rolling groove 91, the probe Ms abuts the groove surface 92. However, a position in the axial direction (in FIG. 3, the Z direction) of the probe Ms is not determined. This is because the probe Ms merely comes in one-point contact with the ball rolling groove 91. For this reason, the probe Ms moves in the axial direction (positional deviation) while abutting the groove surface 92. Accordingly, it is impossible to securely measure the P.C.D. of the ball rolling groove 91 using the micrometer M (the probe Ms).

In a case that the probe Ms has a radius larger than that of the groove surface 92, when the probe Ms of the micrometer M is pushed against the ball rolling groove 91, the probe Ms abuts the edge section of the groove surface 92. For this reason, a position in the axial direction of the probe Ms is determined. However, since the probe Ms does not abut the groove surface 92, it is impossible to securely measure the P.C.D. of the ball rolling groove 91.

When the probe Ms has the same radius as the groove surface 92, the above-mentioned disadvantages are considered to be solvable. However, it is also impossible to match the radius of the groove surface 92 with the radius of the probe Ms in actuality. This is because, even when the probe Ms is formed to have a radius equal to the radius of the groove surface 92, a machining error should be included in the radius of the probe Ms.

In this way, it is impossible to securely measure the P.C.D. of the ball rolling groove 91 using the micrometer M (the probe Ms).

As described above, in the rotary shaft device 3 according to the embodiment of the present invention, the ball rolling grooves 21 in which the balls 39 of the double row angular bearings 35 and 36 roll are formed in the outer circumferential surface of the rotary shaft 20. The ball rolling groove 21 is formed in a so-called Gothic arch shape. For this reason, it is possible to securely measure the P.C.D. of the ball rolling groove 21 using the micrometer M.

In the rotary shaft device 3, as the rotary shaft 20 and the bearing 30 (the angular bearings 35 and 36) are integrally formed with each other, the inner wheel of the bearing 30 can be omitted. For this reason, the rotary shaft device 3 can provide a compact exterior in the radial direction of the apparatus, and reduce cost thereof.

Since the double row angular bearings 35 and 36 are disposed at a first end side of the rotary shaft 20 and the radial bearing 31 is disposed at a second end side, a load in a thrust direction (the axial direction) and a load in a radial direction can be securely received to smoothly rotate the rotary shaft 20.

Since the vertical shaft wind turbine generator 1 according to the embodiment of the present invention uses the rotary shaft device 3, even when a wind volume (a wind speed) of the wind W received by the wind turbine 10 is slight, the wind turbine 10 and the rotary shaft 20 can be easily rotated. For this reason, power generation efficiency of the vertical shaft wind turbine generator 1 is increased.

In the rotary shaft device 3, ball rolling grooves 37s and 38s of the outer wheels 37 and 38 have a circular arc shape. The ball rolling grooves 37s and 38s are opposite to the ball rolling groove 21 formed in the outer circumferential surface of the rotary shaft 20 with the ball 39 interposed therebetween. For this reason, insertion of the balls 39 into the angular bearings 35 and 36 becomes easy, and ease of assembly of the rotary shaft device 3 is improved.

The present invention is not limited to the above-mentioned embodiment, but various modifications may be made without departing from the scope of the present invention.

For example, in the above-mentioned embodiment, while the vertical shaft wind turbine generator 1 that rotates the wind turbine 10 using the wind W as a working fluid has been described as the vertical shaft fluid power generator, the present invention is not limited thereto. The vertical shaft fluid power generator may be a vertical shaft hydraulic generating apparatus that rotates a water wheel (a bladed wheel) using water as a working fluid. A hydraulic generating apparatus in which a blade is immersed in water of an irrigation channel and a generator is installed on water may be provided. Even in such a hydraulic generating apparatus, the vertical shaft hydraulic generating apparatus can provide the same effect.

In the above-mentioned embodiment, while the case in which, in the bearing 30, the double row angular bearings are arranged at the upward side in the central axis C direction (the +Z direction) of the rotary shaft 20 and the radial bearings are arranged at the downward side in the central axis C direction (the −Z direction) of the rotary shaft 20 has been described, the present invention is not limited thereto. The double row angular bearings may be arranged at the downward side in the central axis C direction of the rotary shaft 20, and the radial bearings may be arranged at the upward side in the central axis C direction of the rotary shaft 20.

The angular bearings 35 and 36 may be arranged in front alignment or parallel alignment, in addition to rear alignment.

While the ball 39 is used as a rolling element of the radial bearing 31, the present invention is not limited thereto. For example, a roller or the like may be used as the rolling element.

The wind turbine (the rotor) is not limited to the gyromill type. The wind turbine (the rotor) may be a Darius type, a linear wing type, a Savonius type, a paddle type, a crossflow type, an S-rotor type, or the like.

REFERENCE SIGNS LIST

1 vertical shaft wind turbine generator (vertical shaft fluid power generator)
3 rotary shaft device
10 wind turbine
11 blade
20 rotary shaft (shaft body)
21 ball rolling groove
24 clearance groove
31 radial bearing
35, 36 angular bearing
37, 38 outer wheel
37s, 38s ball rolling groove
39 ball (rolling element)
40 casing (support body)
50 generator

The invention claimed is:

1. A rotary shaft device for a vertical shaft fluid power generator, the rotary shaft device comprising:
   a shaft body;
   a plurality of blades arranged about a central axis of the shaft body and is connected to the shaft body;
   a support body configured to rotatably support the shaft body via a bearing; and
   a generator configured to generate an electric energy by a rotation of the shaft body,
   wherein, as the bearing, double law angular bearings are installed,
   wherein the shaft body has double law ball rolling grooves formed in an outer circumferential surface of the shaft body, in which rolling elements of the double law angular bearings roll,
   wherein each of the double law ball rolling grooves is formed in a Gothic arch shape having a first groove surface formed at one side in an axial direction of the shaft body with reference to a groove center, and a second groove surface formed at the other side in the axial direction,
   wherein the first groove surface and the second groove surface are formed having a space in between such that a spherical probe, which has a radius of curvature smaller than that of the first groove surface and the second groove surface and larger than that of one of the rolling elements, comes in one-point contact with each of the first groove surface and the second groove surface,
   wherein the double law angular bearings comprise a first angular bearing and a second angular bearing adjacent to the first angular bearing,
   wherein the double law ball rolling grooves comprise a first ball rolling groove corresponding to the first angular bearing and a second ball rolling groove corresponding to the second angular bearing,
   wherein the rolling elements comprise a first rolling element corresponding to the first angular bearing and a second rolling element corresponding to the second angular bearing, and
   wherein an angular contact configuration is formed in which the first rolling element rolls in contact only with a second groove surface of the first ball rolling groove and the second rolling element rolls in contact only with a first groove surface of the second ball rolling groove.

2. The rotary shaft device according to claim 1, wherein the bearing further comprises: a radial bearing.

3. A vertical shaft fluid power generator comprising:
   the rotary shaft device for vertical shaft fluid power generator according to claim 1.

4. A vertical shaft power generator comprising:
   the rotary shaft device for the vertical shaft fluid power generator according to claim 2.

* * * * *